(12) United States Patent
Adair et al.

(10) Patent No.: US 7,388,054 B2
(45) Date of Patent: Jun. 17, 2008

(54) FLUOROPOLYMER CURING CO-AGENT COMPOSITIONS

(75) Inventors: Eric W. Adair, Hugo, MN (US); Peter Bissinger, Diessen (DE); Steven Gustaaf Corveleyn, Knokke-Heist (BE); Robert Edward Eggers, Arden Hills, MN (US); Kai Helmut Lochhaas, Neuoetting (DE); Werner M. A. Grootaert, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 185 days.

(21) Appl. No.: 11/275,332

(22) Filed: Dec. 23, 2005

(65) Prior Publication Data

US 2007/0149714 A1 Jun. 28, 2007

(51) Int. Cl.
*C08F 259/00* (2006.01)
(52) U.S. Cl. ...................................... 525/276
(58) Field of Classification Search ................ 525/276
See application file for complete search history.

(56) References Cited

U.S. PATENT DOCUMENTS

| | | | |
|---|---|---|---|
| 4,983,680 A | | 1/1991 | Ojakaar |
| 5,081,192 A | * | 1/1992 | Tatemoto .................... 525/288 |
| 5,366,806 A | | 11/1994 | Fujiki et al. |
| 5,447,993 A | | 9/1995 | Logothetis |
| 5,639,825 A | | 6/1997 | Nanbu et al. |
| 6,335,413 B1 | | 1/2002 | Zech et al. |
| 6,500,903 B2 | | 12/2002 | Wlassics et al. |
| 6,613,846 B2 | | 9/2003 | Hintzer et al. |
| 6,734,240 B2 | | 5/2004 | Staller et al. |
| 6,759,494 B2 | | 7/2004 | Wlassics et al. |
| 6,890,995 B2 | | 5/2005 | Kolb et al. |
| 2002/0103304 A1 | | 8/2002 | Hintzer et al. |
| 2003/0125463 A1 | * | 7/2003 | Tatsu et al. .................. 525/101 |
| 2004/0054055 A1 | | 3/2004 | Fukushi et al. |

FOREIGN PATENT DOCUMENTS

| | | |
|---|---|---|
| EP | 0 276 790 B1 | 8/1988 |
| JP | 59-025379 | 2/1984 |
| JP | 62088208 A | 10/1985 |
| JP | 62-081440 | 4/1987 |

OTHER PUBLICATIONS

"Carbosilanes", G. Fritz, E. Matern, Springer, Heildelberg 1986.
"Chemistry of Fluorocarbon Elastomers", A. Logothetis, Prog. Polym. Sci., vol. 14, 1989, pp. 251-296.
"Elastomers, Synthetic (Fluorocarbons)", Grootaert et al., Kirk-Othmer Encyclopedia of Chem. Technology—4th Ed. vol. 8, pp. 990-1005.
"Fluorocarbon Elastomers (Commercial)", W.M.A. Grootaert, Polymeric Materials Encyclopedia, vol. 4, F-G, 1996.
"Fluoroelastomers, synthesis, properties and applications", Ameduri, et al, Prog. Polym. Sci. 26, (2001), pp. 105-187.
"Hyperbranched Polyalkenylsilanes by Hydrosilylaion with Platinum Catalysts. I. Polymerization", M. Moeller et al., Journal of Poly. Sci. vol. 38 (2000) pp. 741-751.

* cited by examiner

*Primary Examiner*—Bernard Lipman
(74) *Attorney, Agent, or Firm*—Dana M. Ehrich; C. Michael Geise

(57) ABSTRACT

Provided is a composition comprising a fluorocarbon polymer, a radical initiator, and a first curing co-agent. The first curing co-agent comprises at least one silicon-containing group selected from a hydrocarbyl silane and a hydrocarbyl silazane. Furthermore, the first curing co-agent is substantially free of siloxane groups and comprises at least one polymerizable ethylenically unsaturated group. Also provided are the reaction product of these compositions and a method of making an elastomer comprising curing these compositions.

19 Claims, No Drawings

FLUOROPOLYMER CURING CO-AGENT COMPOSITIONS

TECHNICAL FIELD

This description relates to fluoropolymer curing co-agent compositions, cured articles, and methods for curing.

BACKGROUND

Fluorinated and particularly perfluorinated elastomers have unique thermal and chemical resistance properties. Preparation of these elastomers from fluoropolymer precursors (sometimes referred to as "raw gums"), however, can be difficult. The fluoropolymer precursors and compositions containing the fluoropolymer precursors may be incompatible with processing and curing additives, such as, for instance, triallylisocyanurate (TAIC). In addition to incompatibility, TAIC is also disposed to undesirable homopolymerization, which can lead to processing difficulties in preparing fluorinated elastomers.

SUMMARY

In one aspect, the present description relates to a composition comprising a fluorocarbon polymer, a radical initiator, and a first curing co-agent. The first curing co-agent comprises at least one silicon-containing group selected from a hydrocarbyl silane and a hydrocarbyl silazane and is substantially free of siloxane groups. The first curing co-agent comprises at least one polymerizable ethylenically unsaturated group.

In another aspect, the present description provides a method for forming an elastomer comprising curing a composition comprising a fluorocarbon polymer, a radical initiator, and a first curing co-agent. The first curing co-agent comprises at least one silicon-containing group selected from a hydrocarbyl silane and a hydrocarbyl silazane and is substantially free of siloxane groups. The first curing co-agent comprises at least one polymerizable ethylenically unsaturated group.

In yet another aspect, the present description provides an elastomer comprising the reaction product of a fluorocarbon polymer, a radical initiator, and a first curing co-agent. The first curing co-agent comprises at least one silicon-containing group selected from a hydrocarbyl silane and a hydrocarbyl silazane and is substantially free of siloxane groups. The first curing co-agent comprises at least one polymerizable ethylenically unsaturated group.

The composition described herein, in some embodiments, shows improved rheological properties compared to compositions obtained by the use, for instance, of triallylisocyanurate as the sole curing co-agent. Indeed, when triallylisocyanurate is used as a second curing co-agent in combination with a first curing co-agent as described herein, the compositions generally display a higher t'50 and t'90 than those compositions that use triallylisocyanurate (TAIC) as the sole curing co-agent.

Generally, compositions as described herein also provide a surprising advantage over those containing TAIC as the sole curing co-agent in that TAIC is prone to undesirable homopolymerization. Compositions wherein TAIC is the sole curing co-agent often give mold fouling, mold sticking, and surface bleeding. In contrast, compositions comprising the first curing co-agents described herein may display better mold release, and decreased mold fouling compared to compositions employing TAIC as the sole curing co-agent.

Furthermore, TAIC is not easily processable with the fluorocarbon polymers described herein. Particularly, TAIC is not easily incorporated using conventional processing methods. In contrast, the first curing co-agents such as those described herein, are easily incorporated into the fluorocarbon polymers described herein. This easy incorporation leads to more commercially desirable processing.

In other embodiments it has surprisingly been found that when a first curing co-agent as described herein is used in combination with a second curing co-agent, particularly when used in combination with a second curing co-agent such as, for example, TAIC, the compression set for an elastomer formed by curing the fluoropolymer is as good or better than an elastomer formed by curing a fluoropolymer having TAIC as the sole curing co-agent. Thus, the processing advantages described herein may be obtained without a significant change in the physical properties of the compositions or elastomeric products described herein.

The above summary is not intended to describe each disclosed embodiment or every implementation of the present invention. The detailed description and examples that follow, more particularly exemplify illustrative embodiments.

DETAILED DESCRIPTION

In one aspect, the present description provides a first curing co-agent comprising at least one silicon-containing group selected from a hydrocarbyl silane and a hydrocarbyl silazane. The first curing co-agent is substantially free of siloxane groups. By hydrocarbyl silane is meant a silane compound having some or all of the silicon-bound hydrogen atoms replaced by hydrocarbyl groups. Furthermore, where multiple silicon atoms are present, multivalent hydrocarbyl groups may be interposed between some or all of the silicon atoms. The hydrocarbyl groups may be non-fluorinated, partially fluorinated, or perfluorinated. By hydrocarbyl silazane is meant a silazane compound having some or all of the silicon-bound hydrogen atoms, some or all of the silicon-bound amino-groups, or some or all of the nitrogen bound hydrogen atoms replaced by hydrocarbyl groups. Furthermore, where multiple silicon atoms are present, multivalent hydrocarbyl groups may be interposed between some or all of the silicon atoms instead of or in addition to secondary or tertiary amine groups. The first curing co-agent comprises at least one polymerizable ethylenically unsaturated group. In other aspects, the first curing co-agent may comprise at least two, or even at least three polymerizable ethylenically unsaturated groups. The first curing co-agent may include, for instance, unsaturated carbosilane dendrimers as described in U.S. Pat. No. 6,335,413 and unsaturated branched or hyperbranched carbosilane polymers as described by M. Moeller et al., Journal of Polymer Science A (2000) 741-751.

In another aspect, the curing co-agent has a structure according to the following formula:

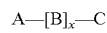

A is selected from groups having the general formula $SiR^1{}_n R^2{}_{(3-n)}$. Each $R^1$ is independently selected from a polymerizable ethylenically unsaturated group having 2 to 15 carbon atoms and each $R^2$ is independently selected from a hydrogen atom, an aliphatic group having 1 to 15 carbon atoms, an aromatic group having 1 to 15 carbon atoms, and a group having the general formula NR'R" wherein each R' and R" is selected from $R^1$, a hydrogen atom, an aliphatic group having 1 to 15 carbon atoms, and an aromatic group having 1 to 15 carbon atoms and wherein n is 0 to 3. In some embodiments, x is 0 to 15. B is selected from groups having the general formula Q-Si($R^3$)($R^4$)-Q, wherein each $R^3$ and $R^4$ is independently selected from $R^1$ and $R^2$. Each Q is a multivalent linking group independently selected from a linear alkylene, a branched alkylene, an arylene, an alkarylene, —NR'''— wherein R''' is selected from $R^1$, a hydrogen atom, an aliphatic group having 1 to 15 carbon atoms, and an aromatic group having 1 to 15 carbon atoms, a covalent bond, and combinations thereof. C is selected from A, $R^1$, and $R^2$.

In some embodiments, each $R^1$ is independently selected from vinyl, allyl, methallyl (i.e., 2-methyl-2-propenyl), 1-propenyl, 2-propenyl, butenyl, pentenyl, hexenyl, and 3(4)-vinyl-phenylene. In other embodiments, each $R^2$ is independently selected from methyl, ethyl, propyl, 2-phenyl-ethyl, 3,3,3-trifluoropropyl, and phenyl. Particularly suitable curing co-agents include, for example, those selected from trialkylvinylsilane, trialkylallylsilane, tetraallylsilane, vinyltriallylsilane, phenyltriallylsilane, tetravinylsilane, diphenyldiallylsilane, methylphenyldiallylsilane, methylphenyldivinylsilane, diphenyldivinylsilane, methyltriallylsilane, hexenyltrivinylsilane, bis(triallylsilyl)-ethane, and combinations thereof. In all of these cases, allyl- may be replaced by methallyl-. In some embodiments, ethylenic unsaturation may be terminal (like allyl) to the organic residue in question. In other embodiments, ethylenic unsaturation may be internal (like 1-propenyl). The curing co-agents may be used in combination with other curing co-agents. The additional curing co-agents may be additional first curing co-agents, or they may be second curing co-agents.

In yet another aspect, the first curing co-agent has a structure according to the following formula:

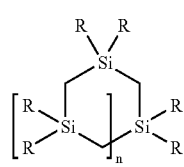

(II)

wherein each R is independently selected from $R^1$ and $R^2$ and n is 0 to 2.

Other curative co-agents include, for instance,

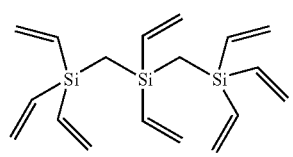

Compound I and

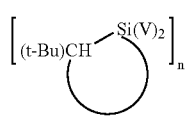

Compound II wherein Compound II has a cyclic structure, V is a vinyl group, t-Bu is a tertiary butyl group, and n is 2 to 4 (that is, the cyclic structure is a 4, 6, or 8 member ring). These co-agents may be prepared, for instance, as described in G. Fritz, E. Matem, "Carbosilanes", Springer, Heildelberg 1986.

Second curing co-agents include, for instance, cyanurate and isocyanurate curing co-agents. Examples include, tri(methyl)allyl isocyanurate, triallyl isocyanurate, trimethallyl cyanurate, poly-triallyl isocyanurate, xylene-bis(diallyl isocyanurate), N,N'-m-phenylene bismaleimide, diallyl phthalate, tris(diallylamine)-2-triazine, triallyl phosphite, 1,2-polybutadiene, ethyleneglycol diacrylate, diethyleneglycol diacrylate, and combinations thereof.

In another aspect, second curing co-agents may include, for instance, those selected from a group having the formula: (III) $CH_2$=CH—$R_f^1$—CH=$CH_2$. In this formula, $R_f^1$ is selected from a divalent perfluoroaliphatic group optionally containing one or more O atoms, a perfluoroarylene group, and a perfluoroalkarylene group. Examples of suitable second curing co-agents such as those described by the formula $CH_2$=CH—$R_f^1$—CH=$CH_2$ include, for instance, 1,6-divinylperfluorhexane.

Second curing co-agents also include trivinylcyclohexane, triallylcyclohexane, and derivatives thereof. By "derivatives" in this context is meant second curing co-agents having a cyclohexane structure that are substituted with at least one group selected from those having the general formula —CA=$CB_2$ and —$CA_2CB$=$CG_2$. In this context each A, B, and G may independently be selected from a hydrogen atom, a halogen, an alkyl group, an aryl group, and an alkaryl group, the latter three of which may be non-fluorinated, partially fluorinated, or perfluorinated.

First curing co-agents, when used alone, or in combination as a plurality of first curing co-agents, or in combination with a second curing co-agent, may generally be used in any amount. In some embodiments it is useful to include a first curing co-agent or combination of first curing co-agent and optionally additional first curing co-agent(s) or a second curing co-agent(s) in an amount of 1 to 10 parts, particularly 1 to 5 parts per 100 parts of the fluorocarbon polymer.

The compositions may also include fillers that may improve the general physical properties of the cured fluoroelastomers. The fillers are included in about 10 parts per 100 parts of the fluorocarbon polymer. Non-limiting examples of fillers include carbon blacks, graphites, conventionally recognized thermoplastic fluoropolymer micropowders, clay, silica, talc, diatomaceous earth, barium sulfate, wollastonite, calcium carbonate, calcium fluoride, titanium oxide, and iron oxide. Combinations of these fillers may also be employed. Those skilled in the art are capable of selecting specific fillers at amounts in the noted range to achieve desired physical characteristics in a cured elastomer.

Other materials may be incorporated into the composition to further enhance the physical properties of the composition. For example, acid acceptors may be employed to facilitate the cure and thermal stability of the compound. Suitable acid acceptors may include, for instance, magnesium oxide, lead oxide, calcium oxide, calcium hydroxide, dibasic lead phosphate, zinc oxide, barium carbonate, strontium hydroxide, calcium carbonate, hydrotalcite, alkali stearates, magnesium oxalate, or combinations thereof. The acid acceptors may be used in amounts ranging from about 1 to about 25 parts per 100 parts by weight of the polymer. In another aspect, however, such acid acceptors are not necessary and their exclusion may allow the formation of so-called clear elastomers.

Fluorocarbon polymers useful in the compositions described herein include, for instance, those that may be cured to prepare a fluoroelastomer. The fluorocarbon polymer and hence the fluoroelastomer prepared therefrom, may be partially fluorinated or may be perfluorinated. The fluorocarbon polymer may also, in some aspects, be post-fluorinated. Monomers useful as constituent units of the fluorocarbon polymers include, for instance, vinylidene fluoride, tetrafluoroethylene, hexafluoropropylene, vinyl ether (e.g., perfluoro (methyl vinyl) ether), chlorotrifluoroethylene, pentafluoropropylene, vinyl fluoride, propylene, ethylene, and combinations thereof.

When a fluorinated vinyl ether is used, the fluorinated vinyl ether may be a perfluoro(vinyl) ether. In some embodiments, the perfluoro(vinyl) ether is selected from $CF_2$=CFO-$[D]_x$-$R_f$ wherein each D is independently selected from —$(CF_2)_z$—, —$O(CF_2)_z$—, —$O(CF(CF_3)CF_2)$—, and —$CF_2CF(CF_3)$—, each z is independently 1 to 10, x is 0 to 10, and $R_f$ is a linear or branched perfluoroalkyl having 1 to 10 carbon atoms. Examples include, for instance, $CF_2$=$CFOCF_2OCF_3$, $CF_2$=$CFOCF_2CF_2OCF_3$, $CF_2$=$CFOCF_2CF_2CF_2OCF_3$, $CF_2$=$CFOCF_2CF_2CF_2CF_2OCF_3$, $CF_2$=$CFOCF_2OCF_2CF_3$, $CF_2$=$CFOCF_2CF_2OCF_2CF_3$, $CF_2$=$CFOCF_2CF_2CF_2OCF_2CF_3$, $CF_2$=$CFOCF_2CF_2CF_2CF_2OCF_2CF_3$, $CF_2$=$CFOCF_2CF_2OCF_2OCF_3$, $CF_2$=$CFOCF_2CF_2OCF_2CF_2OCF_3$, $CF_2$=$CFOCF_2CF_2OCF_2CF_2CF_2OCF_3$, $CF_2$=$CFOCF_2CF_2OCF_2CF_2CF_2CF_2OCF_3$, $CF_2$=$CFOCF_2CF_2OCF_2CF_2CF_2CF_2CF_2OCF_3$, $CF_2$=$CFOCF_2CF_2(OCF_2)_3OCF_3$, $CF_2$=$CFOCF_2CF_2(OCF_2)_4OCF_3$, $CF_2$=$CFCF_2OCF_2CF_2OCF_3$, $CF_2CFOCF_2CF_2OCF_2OCF_2OCF_3$, $CF_2$=$CFOCF_2CF_2OCF_2CF_2CF_3$, $CF_2$=$CFOCF_2CF_2OCF_2CF_2OCF_2CF_2CF_3$, $CF_2$=$CFCF_2OCF_2CF_2OCF_3$, $CF_2$=$CFCF_2OCF_2OCF_3$, $CF_2$=$CFOCF_2CF_2CF_3$, $CF_2$=$CFOCF(CF_3)CF_2CF_3$, $CF_2$=$CFOCF_3$, $CF_2$=$CFOCF_2CF_3$, and combinations there In another aspect, the fluorocarbon polymers described herein may comprise a cure site monomer. Cure site monomers allow for the preparation of an elastomer by curing the fluorocarbon polymer. When included, the cure site monomer may, for instance, be selected from one or more compounds of the formula: (IV) $CX_2$=CX(Z). In this formula, each X may be independently selected from H and F; and Z may be selected from Br, I, Cl, and $R'_fU$. In this context, U may be selected from Br, I, Cl, and CN and $R'_f$ is a perfluorinated divalent linking group optionally containing one or more O atom(s). The cure site monomer also may, for instance, be selected from one or more compounds of the formula: (V) $Y(CF_2)_qY$. In this formula, each Y may be selected from Br, I and Cl, and q is 1 to 6. In either of these aspects, Z and Y may be chemically bound to chain ends of the fluorocarbon polymer. Examples of cure site monomers useful in the presently described fluorocarbon polymers include, for instance, 1-bromo-1,1,2,2-tetrafluoro-3-butene, bromotetrafluoroethylene, 1-bromo-2,2-difluoroethylene, and $CF_2$=$CFO(CF_2)_5CN$ (MV5CN).

The polymers described herein may be prepared using batch or semi-batch, or continuous emulsion polymerization processes. They may also be prepared by suspension or solution polymerization processes. These include, for instance, free-radical polymerization.

In another aspect, the compositions described herein may include a radical initiator. The radical initiator may include, for instance, a peroxide. Useful peroxides include organic and inorganic peroxides. When organic peroxides are used, they may further be chosen from those that do not decompose at dynamic mixing temperatures. Suitable radical initiators include, for instance, dicumyl peroxide, 2,5-dimethyl-2,5-di(t-butylperoxy)hexane, di-t-butyl peroxide, t-butylperoxy benzoate, t-butylperoxy-diisopropyl benzene, 2,5-dimethyl-2,5-di(t-butylperoxy)hexyne-3, lauryl peroxide, and combinations thereof.

In yet another aspect, the present description relates to a method for preparing an elastomer comprising curing the composition described herein to give an elastomer (cured material).

In preparing a composition for curing, the composition can be compounded with the curing co-agent(s) or mixed in one or several steps, using any of the usual rubber mixing devices such as internal mixers (e.g., Banbury mixers), roll mills, etc. For best results, the temperature of mixing should not rise above the temperature of initiation of a curing reaction. One of ordinary skill in the art is capable of determining this temperature based upon the radical initiator chosen, the curing co-agent(s) present, the fluorocarbon polymer, and the like. In some embodiments, the components may be distributed uniformly throughout the composition. This may help to provide a more effective cure.

In one aspect, curing may be press curing. Pressing the composition (i.e., press cure) may typically be conducted at a temperature of about 95-230° C., particularly from about 150-205° C., for a period of about 1 minute to about 15 hours, usually from about 1 to 10 minutes. In this aspect, the process comprises providing the composition in a mold and heating the mold. The process further comprises pressing the composition (that is, applying pressure) at a pressure of about 700 to 20,000 kPa, particularly 3,400 to 6,800 kPa. The process may further comprise first coating the mold with a release agent and pre-baking the mold. Pre-baking, in this sense, refers to heating the mold before adding the composition. The mold may be returned to room temperature before adding the composition. In another aspect, the first curing co-agents described herein may aid in providing release from a mold. In this respect, press curing the compositions described herein may not require a first coating of release agent.

The process may further comprise post-curing the elastomer obtained by curing the composition as described herein. Post curing may take place in an oven at a temperature of about 150 to 315° C., more particularly at about 200 to 260° C., for a period of about 2 to 50 hours or depending on the cross-sectional thickness of the sample. For thicker samples, the temperature during the post cure may be raised gradually from the lower end of a range to a desired maximum temperature. The maximum temperature, for instance, 260° C., may then be held for about 4 hours or more.

The present description also provides a reaction product of a fluorocarbon polymer, a radical initiator, a first curing co-agent, and optionally a second curing co-agent. The first curing co-agent comprises at least one silicon-containing group selected from a hydrocarbyl silane and a hydrocarbyl silazane, wherein the first curing co-agent is substantially free of siloxane groups and comprises at least one polymerizable ethylenically unsaturated group. In one aspect, the reaction product is an elastomer.

The reaction product may be processed and provided as a shaped article, for example, by extrusion (for instance in the shape of a hose or a hose lining) or molding (for instance, in the form of an O-ring seal). The composition can be heated to cure the composition and form a cured, shaped elastomer article.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

These abbreviations are used in the following examples: wt=weight, min=minutes, mol=mole; phr=parts per hundred parts of rubber, hr=hour, ° C.=degrees Celsius, psi=pounds per square inch, MPa=megapascals, and N-m=Newton-meter.

The following abbreviations and shorthand designations are used:

| ABBREVIATION | DESCRIPTION |
|---|---|
| TFE | tetrafluoroethylene |
| HFP | hexafluoropropylene |
| VDF | vinylidenefluoride |
| BTFB | 1-bromo-1,1,2,2-tetrafluoro-3-butene |
| BTFE | bromotetrafluoroethylene |
| PMVE | perfluoro(methyl vinyl) ether |
| MV5CN | $CF_2=CFO(CF_2)_5CN$ |
| PEROXIDE1 | 2,5-dimethyl-2,5-di(t-butylperoxy)hexane on an inert filler. Peroxide crosslinker available under the trade designation "VAROX DBPH-50-HP" from R. T. Vanderbilt, Norwalk, CT. |
| PEROXIDE2 | 2,5-dimethyl-2,5-di(t-butylperoxy)hexane on a silica filler. Peroxide crosslinker available under the trade designation "TRIGONOX 101-50D-pd" from Akzo Nobel, Arnhem, Netherlands |
| PEROXIDE3 | t-butylperoxy-diisopropyl benzene available under the trade designation "PERKADOX 14-40 MB" from Akzo Nobel, Arnhem, Netherlands. |
| TAS | Tetraallylsilane available from Sigma-Aldrich Co, or MATRIX MARKETING GMBH, Bahnweg Nord 35, CH-9475 Sevelen, Switzerland |
| TVS | Tetravinylsilane, commercially available from ABCR GmbH & Co KG, Kalsruhe, Germany |
| TVC | Trivinylcyclohexane |
| DVPH | 1,6 divinylperfluorohexane available from Apollo Scientific Limited Derbyshire, United Kingdom |
| Fluoropolymer A | Copolymer of 17.0 wt % TFE, 28.8 wt % VDF, 53.9 wt % MV31, and 0.3 wt % BTFE |
| Fluoropolymer B | Copolymer of 55.0 wt % TFE, 44.2 wt % PMVE, and 0.8 wt % BTFE |
| Fluoropolymer C | Copolymer of 29.5 wt % TFE, 31.2 wt % HFP, 8.5 wt % VDF, and 0.6 wt % BTFE |
| Fluoropolymer D | Copolymer of 48.7 wt % TFE, 47.6 wt % PMVE and 3.7 wt % MV5CN |
| Fluoropolymer E | Blend made of 80 wt % raw gum (TFE (65.8 mol %/51.8 wt %), PMVE (32 mol %/41.8 wt %), MV5CN (2.2 mol %/6.4 wt %)) and 20 wt % PFA6502N. The latter PFA is commercially available from Dyneon LLC, Oakdale, MN. |
| Fluoropolymer F | Copolymer of 47.8 wt % TFE, 47.0 wt % PMVE and 5.2 wt % MV5CN |
| Fluoropolymer G | "AFLAS FA-150P" commercially available from Asahi Glass, Tokyo, Japan. |
| Fluoropolymer H | 12.3 wt % TFE, 60.1 wt % VDF, 26.3 wt % HFP, and 1.2 wt % BTFB |
| MB | Catalyst Masterbatch 20 wt % bistetrabutylphosphonium perfluoroadipate in Fluoropolymer D |
| R972 | Silica available under the trade designation "AEROSIL R972" from Degussa AG, Düsseldorf, Germany |
| N990 | Carbon black available under the trade designation "N-990" from Cabot, Boston, Massachusetts |
| N550 | Carbon black available under the trade designation "FEF-N550" from Cabot Corp., Atlanta, GA |
| ZnO | ZnO, available from Bayer AG, Leverkusen, Germany |
| Carnauba wax | Carnauba wax available from Taber Inc., Barrington, RI |
| S100 | Perfluoropolytrimethyleneoxide available under the trade designation "DEMNUM S100" from Daikin Industries, Osaka, Japan. |
| NaSt | Sodium stearate |
| WS280 | Powder processing additive on an inorganic carrier known under the trade designation "STRUKTOL WS-280" available from Struktol, Stow, OH |

Examples 1-11 and Comparative Examples 1-7

The selected fluoropolymer was compounded on a two-roll mill with the addition of additives as indicated in Table 1. The compounded mixture was press-cured at various temperatures and times as indicated in Table 3. Subsequently the molded test sheets and O-rings were post-cured in air at various temperatures and times as indicated in Table 3.

After press-cure and post-cure, physical properties were measured with dumbbells cut from a post-cured test slab.

TABLE 1

| FORMULATIONS | | | | | | | | | | |
|---|---|---|---|---|---|---|---|---|---|---|
| COMPONENT | CE1 | EX1 | CE2 | EX2 | CE3 | EX3 | CE4 | EX4 | CE5 | EX5 |
| Fluoropolymer A, phr | 100 | 100 | — | — | — | — | — | — | — | — |
| Fluoropolymer B, phr | — | — | 100 | 100 | — | — | — | — | — | — |
| Fluoropolymer C, phr | — | — | — | — | 100 | 100 | — | — | — | — |
| Fluoropolymer D, phr | — | — | — | — | — | — | 100 | 100 | — | — |
| Fluoropolymer E, phr | — | — | — | — | — | — | — | — | 37.5 | 37.5 |
| Fluoropolymer F, phr | — | — | — | — | — | — | — | — | 66.0 | 66.0 |
| Fluoropolymer G, phr | — | — | — | — | — | — | — | — | — | — |
| Fluoropolymer H, phr | — | — | — | — | — | — | — | — | — | — |
| MB, phr | — | — | — | — | — | — | 5.00 | 5.00 | 5.00 | 5.00 |
| PEROXIDE 1 | — | — | — | — | — | — | — | — | 2.00 | 2.00 |
| PEROXIDE 2 | 4.00 | 4.00 | 2.50 | 2.50 | 4.00 | 4.00 | 1.43 | 1.43 | — | — |
| PEROXIDE 3 | — | — | — | — | — | — | — | — | — | — |
| TAIC 72% | 3.00 | 1.42 | 2.50 | 1.29 | 3.50 | 2.07 | 1.79 | 0.71 | 2.50 | 1.00 |
| TAIC 100% | — | — | — | — | — | — | — | — | — | — |
| TAS | — | — | — | — | — | — | — | 0.76 | — | 0.75 |
| TVC | — | — | — | — | — | — | — | — | — | — |
| TVS | — | 1.00 | — | 0.85 | — | 1.00 | — | — | — | — |

TABLE 1-continued

| FORMULATIONS | | | | | | | | | | |
|---|---|---|---|---|---|---|---|---|---|---|
| DVPH | — | — | — | — | — | — | — | — | — | — |
| R972, phr | — | — | — | — | — | — | 1.00 | 1.00 | 0.75 | 0.75 |
| N990, phr | — | — | — | — | — | — | — | — | — | — |
| N550, phr | 10.0 | 10.0 | 10.0 | 10.0 | 10.0 | 10.0 | 10.0 | 10.0 | — | — |
| ZnO, phr | 3.00 | 3.00 | 3.00 | 3.00 | 3.00 | 3.00 | — | — | — | — |
| Carnauba Wax, phr | 0.50 | 0.50 | 0.50 | 0.50 | 0.50 | 0.50 | 0.50 | 0.50 | — | — |
| S100, phr | — | — | — | — | — | — | — | — | 5.00 | 5.00 |
| NaSt, phr | — | — | — | — | — | — | — | — | — | — |
| WS280, phr | — | — | — | — | — | — | — | — | — | — |

| COMPONENT | CE6 | EX6 | CE7 | EX7 | EX8 | EX9 | EX10 | EX11 |
|---|---|---|---|---|---|---|---|---|
| Fluoropolymer A, phr | — | — | — | — | — | — | — | — |
| Fluoropolymer B, phr | — | — | — | — | 100 | 100 | — | — |
| Fluoropolymer C, phr | — | — | — | — | — | — | 100 | 100 |
| Fluoropolymer D, phr | — | — | — | — | — | — | — | — |
| Fluoropolymer E, phr | — | — | — | — | — | — | — | — |
| Fluoropolymer F, phr | — | — | — | — | — | — | — | — |
| Fluoropolymer G, phr | 100 | 100 | — | — | — | — | — | — |
| Fluoropolymer H, phr | — | — | 100 | 100 | — | — | — | — |
| MB, phr | — | — | — | — | — | — | — | — |
| PEROXIDE 1 | 2.50 | 2.50 | 2.50 | 2.50 | 1.50 | 1.50 | — | — |
| PEROXIDE 2 | — | — | — | — | — | — | 4.00 | — |
| PEROXIDE 3 | — | — | — | — | — | — | — | 5.00 |
| TAIC 72% | — | — | 4.30 | — | — | — | — | — |
| TAIC 100% | 4.00 | — | — | — | — | — | — | — |
| TAS | — | 2.40 | — | 1.80 | 2.00 | 2.00 | — | — |
| TVC | — | — | — | — | — | — | 1.5 | — |
| TVS | — | — | — | — | — | — | 1.5 | 0.63 |
| DVPH | — | — | — | — | — | — | — | 2.37 |
| R972, phr | — | — | — | — | 5.00 | — | — | — |
| N990, phr | 30.0 | 30.0 | 30.0 | 30.0 | 15.0 | 15.0 | — | — |
| N550, phr | — | — | — | — | — | — | 10.0 | 10.0 |
| ZnO, phr | — | — | 3.00 | 3.00 | — | — | 3.00 | 3.00 |
| Carnauba Wax, phr | — | — | — | — | — | — | 0.50 | 0.50 |
| S100, phr | — | — | — | — | — | — | — | — |
| NaSt, phr | 1.00 | 1.00 | — | — | — | — | — | — |
| WS280, phr | — | — | 1.00 | 1.00 | — | — | 4.00 | 4.00 |

RESULTS

Rheology, physical properties and compression set are shown in Tables 2 to 4.

Cure rheology tests were carried out using uncured, compounded samples using a rheometer (e.g., Monsanto Moving Die Rheometer (MDR) Model 2000) (Monsanto Company, Saint Louis, Mo.) in accordance with ASTM D 5289-93a at 177° C., no pre-heat, 30 minute elapsed time, and a 0.5 degree arc. Both the minimum torque ($M_L$) and highest torque attained during a specified period of time when no plateau or maximum torque was obtained ($M_H$) were measured. Also measured were the time for the torque to increase 2 units above $M_L$ ($t_S2$), the time for the torque to reach a value equal to $M_L+0.5(M_H-M_L)$, (t'50), and the time for the torque to reach $M_L+0.9(M_H-M_L)$, (t'90). Results are reported in Table 2. In all of the examples, the rheology of the compositions either improved (as measured by t'50 and t'90) or remained relatively constant (as measured by $t_S2$, $M_L$ and $M_H$) when compared to compositions comprising only TAIC. Advantageously, the example compositions displayed improved incorporation of the curing co-agent into the composition and ease of processing. These processing improvements are attainable with no substantial loss in quality of compositional rheology.

TABLE 2

| RHEOLOGY | | | | | | | | | | |
|---|---|---|---|---|---|---|---|---|---|---|
| | CE1 | EX1 | CE2 | EX2 | CE3 | EX3 | CE4 | EX4 | CE5 | EX5 |
| min | 6 | 6 | 6 | 6 | 6 | 6 | 6 | 6 | 12 | 12 |
| ° C. | 177 | 177 | 177 | 177 | 177 | 177 | 177 | 177 | 177 | 177 |
| $M_L$, in-lb (N-m) | 2.41 (0.27) | 2.41 (0.27) | 2.80 (0.32) | 2.73 (0.31) | 1.03 (0.12) | 0.95 (0.11) | 1.08 (0.12) | 1.00 (0.11) | 0.43 (0.05) | 0.39 (0.04) |
| $M_H$, in-lb (N-m) | 7.68 (0.87) | 9.55 (1.08) | 14.95 (1.69) | 16.79 (1.90) | 14.55 (1.64) | 16.86 (1.90) | 7.07 (0.80) | 9.27 (1.05) | 12.35 (1.40) | 15.28 (1.73) |
| $t_S2$, min | 0.64 | 0.66 | 0.49 | 0.48 | 0.53 | 0.56 | 0.91 | 1.11 | 1.17 | 1.25 |

TABLE 2-continued

| RHEOLOGY | | | | | | | | | | |
|---|---|---|---|---|---|---|---|---|---|---|
| t'50, min | 0.71 | 0.83 | 0.65 | 0.69 | 0.69 | 0.80 | 1.20 | 1.82 | 2.08 | 2.37 |
| t'90, min | 1.35 | 1.66 | 1.39 | 1.58 | 1.37 | 1.70 | 4.01 | 4.35 | 9.39 | 8.07 |

| | CE6 | EX6 | CE7 | EX7 | EX8 | EX9 | EX10 | EX11 |
|---|---|---|---|---|---|---|---|---|
| min | 12 | 12 | 12 | 12 | 12 | 12 | 6 | 6 |
| ° C. | 177 | 177 | 177 | 177 | 160 | 160 | 177 | 177 |
| $M_L$, in-lb (N-m) | 1.31 (0.15) | 1.47 (0.17) | 0.54 (0.06) | 0.46 (0.05) | 2.79 (0.32) | 2.57 (0.29) | 0.72 (0.08) | 0.59 (0.07) |
| $M_H$, n-lb (N-m) | 8.45 (0.95) | 9.19 (1.04) | 16.85 (1.90) | 10.6 (1.20) | 21.44 (2.42) | 12.52 (1.41) | 13.22 (1.49) | 9.37 (1.06) |
| $t_S2$, min | 1.08 | 1.74 | 0.62 | 0.95 | 0.96 | 1.21 | 0.72 | 1.24 |
| t'50, min | 1.65 | 3.04 | 0.88 | 1.48 | 1.85 | 1.89 | 1.22 | 1.93 |
| t'90, min | 5.41 | 7.74 | 2.23 | 4.08 | 7.02 | 4.40 | 3.40 | 4.32 |

Press-cured sheets (150 mm×150 mm×2.0 mm) of the curable compositions Examples 1-11 and Comparative Examples 1-7, except where indicated in Tables 3 and 4, were prepared for physical property determination by pressing the composition at various temperatures and times as detailed in Table 3. Press-cured sheets were post-cured by exposure to heat under various temperatures and times detailed in Table 3. All specimens were returned to ambient temperature before testing.

Physical Properties

Tensile strength at break, elongation at break, and modulus at 100% elongation were determined according to ASTM D 412-92 using samples cut from the corresponding press-cured sheets using ASTM Die D.

Hardness was measured using ASTM D 2240-85 Method A with a Type A-2 Shore Durometer.

Table 3 reports physical properties of the press-cured and post-cured sheets of the curable compositions of Examples 1-11 and Comparative Examples 1-7, except where indicated.

TABLE 3

| PHYSICAL PROPERTIES | | | | | | | | | | |
|---|---|---|---|---|---|---|---|---|---|---|
| | CE1 | EX1 | CE2 | EX2 | CE3 | EX3 | CE4 | EX4 | CE5 | EX5 |
| Press cure min | 7 | 7 | 7 | 7 | 7 | 7 | 7 | 7 | 5 | 5 |
| Press cure ° C. | 177 | 177 | 177 | 177 | 177 | 177 | 177 | 177 | 177 | 177 |
| Post cure hr | 16 | 16 | 16 | 16 | 16 | 16 | 16 | 16 | 16 | 16 |
| Post cure ° C. | 230 | 230 | 230 | 230 | 230 | 230 | 230 | 230 | 200 | 200 |
| Tensile Strength at Break, (MPa) psi | B | B | (18.2) 2640 | (16.7) 2422 | (18.9) 2741 | (18.6) 2698 | (13.7) 1987 | (14.1) 2045 | (16.9) 2450 | (14.9) 2165 |
| Elongation at Break, % | B | B | 128 | 113 | 239 | 210 | 206 | 167 | 100 | 105 |
| 100% Modulus, (MPa) psi | B | B | (12.5) 1813 | (13.5) 1958 | (4.40) 638 | (4.40) 638 | (7.10) 1030 | (9.30) 1349 | (16.9) 2445 | (15.7) 2275 |
| Shore A Hardness | B | B | 73 | 70 | 74 | 73 | 75 | 78 | 77 | 77 |

| | CE6 | EX6 | CE7 | EX7 | EX8 | EX9 | EX10 | EX11 |
|---|---|---|---|---|---|---|---|---|
| Press cure min | 30 | 30 | 30 | 30 | 10 | 10 | 7 | 7 |
| Press cure ° C. | 166 | 166 | 166 | 166 | 160 | 160 | 177 | 177 |
| Post cure hr | 16 | 16 | 16 | 16 | 16 | 16 | 16 | 16 |
| Post cure ° C. | 200 | 200 | 200 | 200 | 230 | 230 | 230 | 230 |
| Tensile Strength at Break, (MPa) psi | (16.0) 2326 | (20.9) 3035 | (21.3) 3083 | (16.0) 2326 | (19.2) 2791 | (<3.4) <500 | (18.6) 2698 | (17.5) 2538 |

TABLE 3-continued

| | | | | PHYSICAL PROPERTIES | | | | |
|---|---|---|---|---|---|---|---|---|
| Elongation at Break, % | 316 | 290 | 212 | 316 | 113 | 153 | 230 | 349 |
| 100% Modulus, (MPa) psi | (4.9) 706 | (4.5) 655 | (6.2) 892 | (4.9) 706 | (14.5) 2096 | (6.9) 1006 | (4.2) 609 | (2.7) 391 |
| Shore A Hardness | 71 | 68 | 71 | 66 | 67 | 65 | 71 | 68 |

In Table 3, B indicates "blisters". When blisters are present, the plates could not be made in a way so as to be able to measure properties. Compression set values could be measured however. The examples demonstrate that cured compositions as described can be prepared. These cured compositions show improved mold release and decreased mold fouling as compared to compositions having TAIC as the sole curing co-agent while showing no significant decline (and in some embodiments an improvement) in physical properties.

Specimens of the curable compositions of Examples 1-11 and Comparative Examples 1-7, except where indicated in Table 4, were press-cured and post-cured to form O-rings having a cross-section thickness of 0.139 inch (3.5 mm). The compression set of O-ring specimens was measured using ASTM 395-89 Method B. Results are reported in Table 4 as a percentage of permanent set, and were measured at 25% deflection.

TABLE 4

| | | | | COMPRESSION SET | | | | | |
|---|---|---|---|---|---|---|---|---|---|
| | CE1 | EX1 | CE2 | EX2 | CE3 | EX3 | CE4 | EX4 | CE5 | EX5 |
| hr | 70 | 70 | 70 | 70 | 70 | 70 | 70 | 70 | 70 | 70 |
| ° C. | 200 | 200 | 200 | 200 | 200 | 200 | 200 | 200 | 230 | 230 |
| Compression set % | 27 | 27 | 37 | 29 | 29 | 27 | 41 | 37 | 46 | 30 |

| | CE6 | EX6 | CE7 | EX7 | EX8 | EX9 | EX10 | EX11 |
|---|---|---|---|---|---|---|---|---|
| hr | 70 | 70 | 70 | 70 | 70 | 70 | 70 | 70 |
| ° C. | 150 | 150 | 150 | 150 | 230 | 230 | 200 | 200 |
| Compression set % | 46 | 39 | 15 | 37 | >100 | melted | 36 | 48 |

In Table 4 "melted" means could not measure because sample disintegrated. The examples demonstrate that cured compositions as described can be used to prepare O-rings. These cured compositions show improved mold release and decreased mold fouling as compared to compositions having TAIC as the sole curing co-agent while showing no significant increase (and in some embodiments a favorable decrease) in compression set.

What is claimed is:

1. A composition comprising:
   a fluorocarbon polymer;
   a radical initiator; and
   a first curing co-agent comprising at least one silicon-containing group selected from a silane and a silazane, wherein the first curing co-agent has a structure selected from:
   (i) A—[B]x—C
      wherein A is selected from groups having the general formula SiR1nR2(3-n), wherein each R1 is independently selected from a polymerizable ethylenically unsaturated group having 2 to 15 carbon atoms; each R2 is independently selected from a hydrogen atom, an aliphatic group having 1 to 15 carbon atoms, an aromatic group having 5 to 15 carbon atoms, and a group having the general formula NR'R" wherein each R' and R" is selected from R1, a hydrogen atom, an aliphatic group having 1 to 15 carbon atoms, and an aromatic group having 5 to 15 carbon atoms; and wherein n is 0 to 3;
   wherein x is 0 to 15 and b is selected from groups having the general formula Q—Si(R3)(R4)—Q, wherein R3 and R4 are each independently selected from R1 and R2 and each Q is a divalent linking group independently selected from a linear alkylene; a branched alkylene; an arylene; an alkarylene; —NR'''— wherein R''' is selected from R1, a hydrogen atom, an aliphatic group having 1 to 15 carbon atoms, and an aromatic group having 5 to 15 carbon atoms; a covalent bond; and combinations thereof; and
   wherein C is selected from A, R1, and R2; and

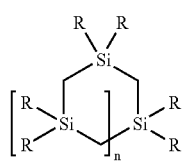

(II)

wherein each R is independently selected from R1 and R2 and n is 0 to 2.

2. The composition of claim 1 wherein each R¹ is independently selected from vinyl, allyl, methallyl, 1-propenyl, 2-propenyl, butenyl, pentenyl, hexenyl, and 3(4)-vinyl-phenylene.

3. The composition of claim 1 wherein each $R^2$ is independently selected from methyl, ethyl, propyl, 2-phenyl-ethyl, 3,3,3-trifluoropropyl, and phenyl.

4. The composition of claim 1 wherein the first curing co-agent is selected from vinyltriallylsilane, phenyltriallylsilane, diphenyldiallylsilane, methylphenyldiallylsilane, methylphenyldivinylsilane, diphenyldivinylsilane, methyltriallylsilane, hexenyltrivinylsilane, bis(triallylsilyl)-ethane, and combinations thereof.

5. The composition of claim 1 wherein the radical initiator is an organic peroxide.

6. The composition of claim 5 wherein the organic peroxide is selected from dicumyl peroxide, 2,5-dimethyl-2,5-di(t-butylperoxy)hexane, di-t-butyl peroxide, t-butylperoxy benzoate, t-butylperoxy-diisopropyl benzene, 2,5-dimethyl-2,5-di(t-butylperoxy)hexyne-3, lauryl peroxide, and combinations thereof.

7. The composition of claim 1 further comprising a second curing co-agent.

8. The composition of claim 7 wherein the second curing co-agent is selected from tri(methyl)allyl isocyanurate, triallyl isocyanurate, tri(methyl)allyl cyanurate, poly-triallyl isocyanurate, xylylene-bis(diallyl isocyanurate), N,N'-m-phenylene bismaleimide, diallyl phthalate, tris(diallylamine)-2-triazine, triallyl phosphite, 1,2-polybutadiene, ethyleneglycol diacrylate, diethyleneglycol diacrylate, and combinations thereof.

9. The composition of claim 7 wherein the second curing co-agent is selected from the group having the formula:

  (III)

wherein $R_f^1$ is selected from a divalent perfluoroaliphatic group optionally containing one or more O atoms, a perfluoroarylene group, and a perfluoroalkarylene group.

10. The composition of claim 7 wherein the second curing co-agent is 1,3,5-trivinyl cyclohexane.

11. The composition of claim 1 wherein the fluorocarbon polymer comprises units derived from a cure site monomer.

12. The composition of claim 11 wherein the cure site monomer is selected from one or more compounds of the formula:

  (IV)

wherein each X is selected from H and F; and

Z is selected from Br, I, Cl, and $R'_f U$ wherein U is selected from Br, I, Cl, and CN; and $R'_f$ is a perfluorinated divalent linking group optionally containing one or more O atom(s); and

  (V)

wherein Y is selected from Br, I and Cl; and q is 1 to 6.

13. The composition of claim 12 wherein the Z and Y are chemically bound to chain ends of the fluorocarbon polymer.

14. The composition of claim 1 wherein the fluorocarbon polymer is perfluorinated.

15. The composition of claim 1 wherein the fluorocarbon polymer is partially fluorinated.

16. The composition of claim 1 wherein the fluorocarbon polymer comprises units derived from monomers selected from vinylidene fluoride, tetrafluoroethylene, hexafluoropropylene, vinyl ether, chlorotrifluoroethylene, pentafluoropropylene, vinyl fluoride, and combinations thereof, optionally further comprising units derived from monomers selected from ethylene and propylene.

17. The composition of claim 16 wherein the vinyl ether is a perfluoro(vinyl) ether.

18. The composition of claim 17 wherein the perfluoro(vinyl) ether is selected from ethers having the general formula:

wherein each D is independently selected from $-(CF_2)_z-$, $-O(CF_2)_z-$, $-O(CF(CF_3)CF_2)-$, and $-CF_2CF(CF_3)-$, each z is independently 1 to 10, x is 0 to 10, and $R_f$ is a linear or branched perfluoroalkyl having 1 to 10 carbon atoms.

19. A method of forming an elastomer comprising curing a composition of claim 1.

* * * * *

UNITED STATES PATENT AND TRADEMARK OFFICE
CERTIFICATE OF CORRECTION

PATENT NO. : 7,388,054 B2
APPLICATION NO. : 11/275332
DATED : June 17, 2008
INVENTOR(S) : Eric W. Adair It is certified that error appears in the above-identified patent and that said Letters Patent is hereby corrected as shown below:

On the Title Page, item (56) in Column 2, under (Other Publications)
Line 11, delete "Hydrosilylaion" and insert -- Hydrosilylation --, therefor.

On the Title Page, item (74) in Column 2, under (Attorney, Agent, or Firm)
Line 1, delete "Dana" and insert -- Dena --, therefor.

Column 1
Line 51, delete "Theological" and insert -- rheological --, therefor.

Column 2
Line 57, after "A–[B]$_X$–C" insert -- (I) --.

Column 4
Line 3, delete "Matem," and insert -- Matern, --, therefor.

Column 5
Line 13, delete "–$_{O(CF2)z}$–," and insert -- –O(CF$_2$)$_z$–, --, therefor.

Column 5
Line 34, delete "there" and insert -- thereof. --, therefor.

Column 6
Line 41, after "or" insert -- more, --.

Column 13
Line 66, in Claim 1, delete "SiRInR2(3-n)," and insert -- SiR$^1_n$R$^2_{(3-n)}$, --, therefor.
Line 66, in Claim 1, delete "R1" and insert -- R$^1$ --, therefor.

Column 14
Line 14, in Claim 1, delete "R2" and insert -- R$^2$ --, therefor.
Line 18, in Claim 1, delete "R1," and insert -- R$^1$, --, therefor.
Line 22, in Claim 1, delete "b" and insert -- B --, therefor.
Line 23, in Claim 1, delete "Si(R3)(R4)—Q," and insert -- Si(R$^3$)(R$^4$)–Q, --, therefor.
Line 23, in Claim 1, delete "R3" and insert -- R$^3$ --, therefor.
Line 24, in Claim 1, delete "R4" and insert -- R$^4$ --, therefor.
Line 24, in Claim 1, delete "R1" and insert -- R$^1$ --, therefor.

UNITED STATES PATENT AND TRADEMARK OFFICE
CERTIFICATE OF CORRECTION

PATENT NO. : 7,388,054 B2
APPLICATION NO. : 11/275332
DATED : June 17, 2008
INVENTOR(S) : Eric W. Adair It is certified that error appears in the above-identified patent and that said Letters Patent is hereby corrected as shown below:

Line 25, in Claim 1, delete "R2" and insert -- $R^2$ --, therefor.
Line 28, in Claim 1, delete "R1," and insert -- $R^1$, --, therefor.
Line 50, in Claim 1, delete "R1," and insert -- $R^1$, --, therefor.
Line 50, in Claim 1, delete "R2;" and insert -- $R^2$; --, therefor.
Line 62, in Claim 1, delete "R1" and insert -- $R^1$ --, therefor.
Line 62, in Claim 1, delete "R2" and insert -- $R^2$ --, therefor.

Signed and Sealed this

Twenty-third Day of December, 2008

JON W. DUDAS
*Director of the United States Patent and Trademark Office*